Patented Oct. 4, 1927.

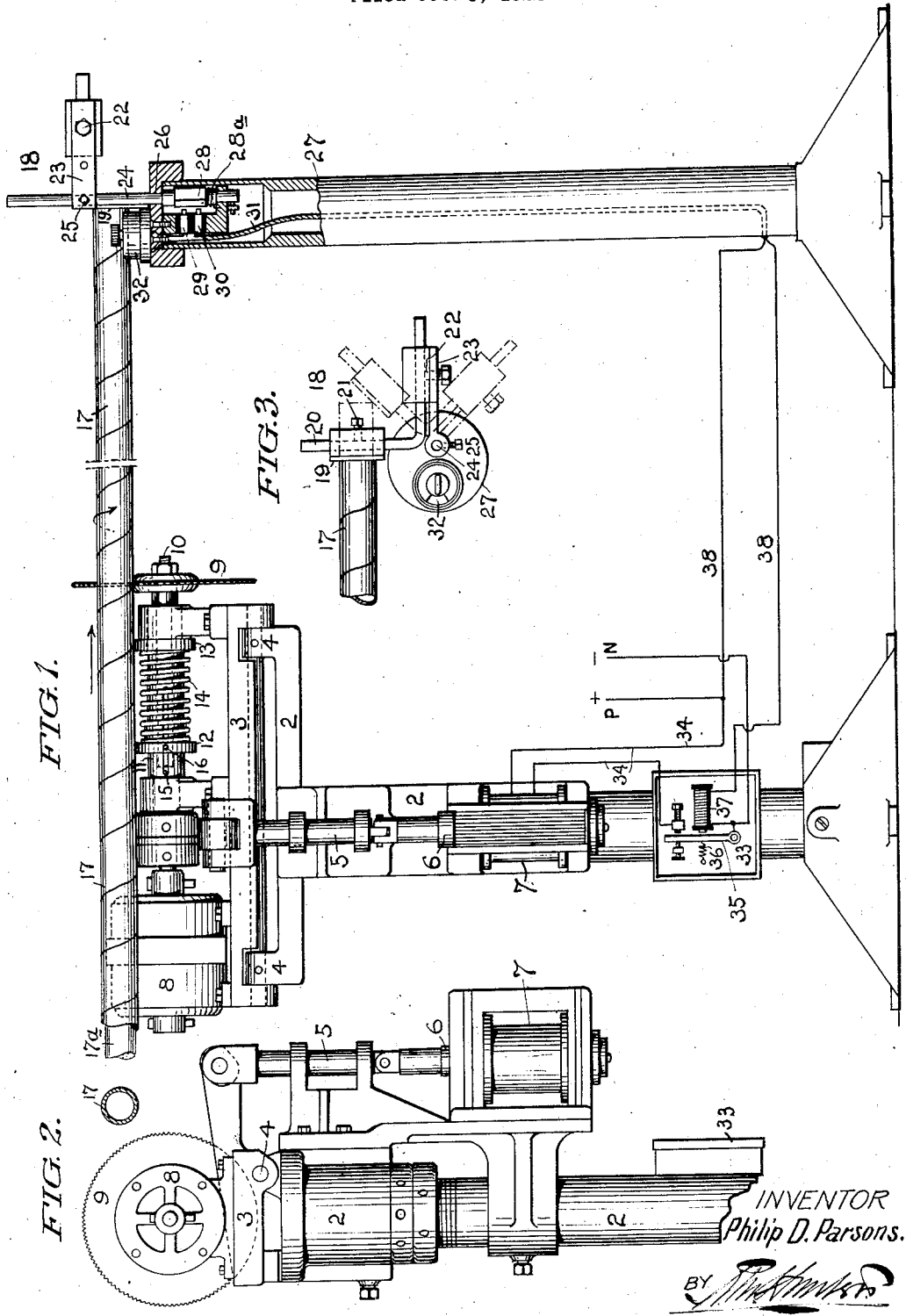

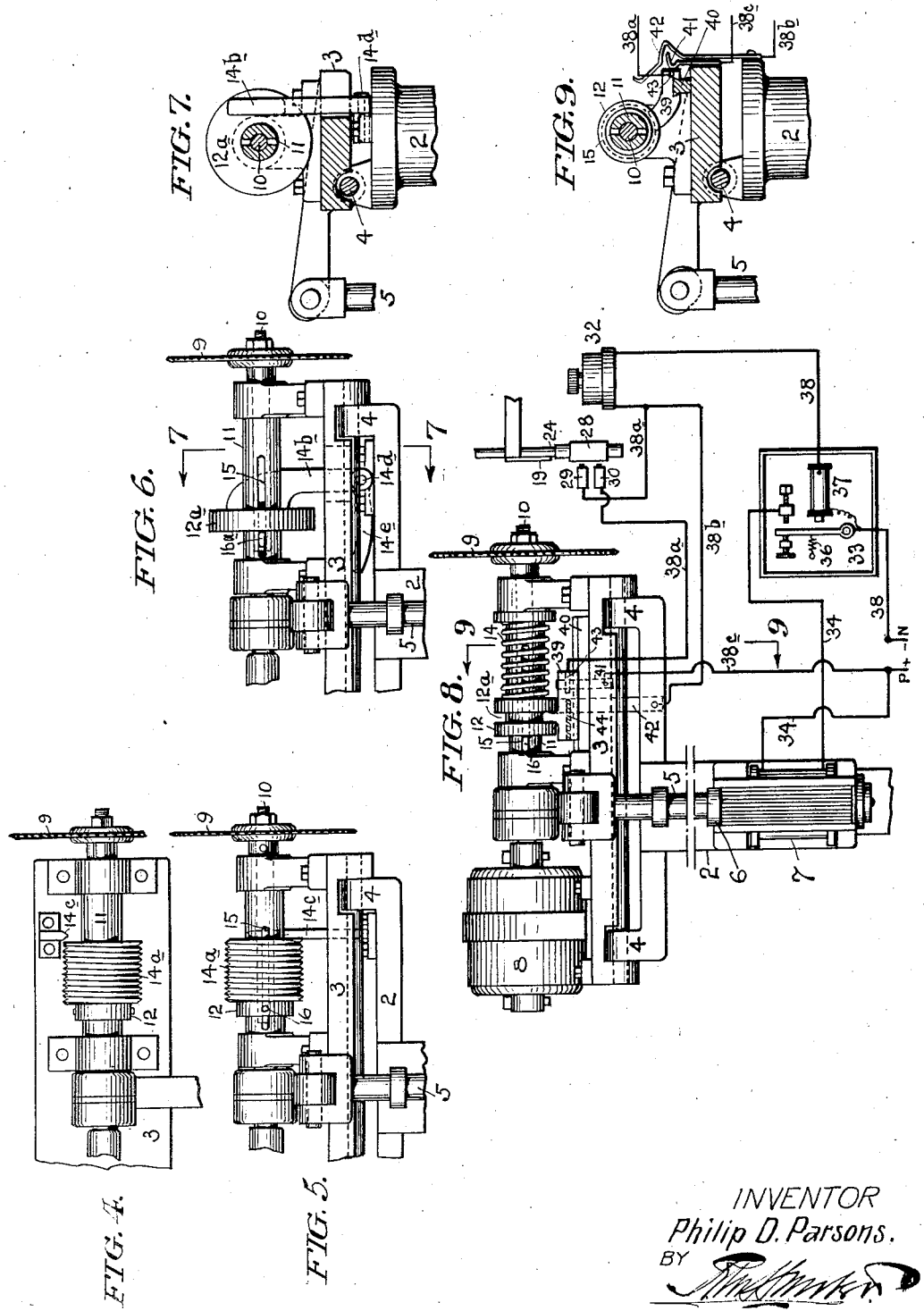

1,643,994

UNITED STATES PATENT OFFICE.

PHILIP D. PARSONS, OF PHILADELPHIA, PENNSYLVANIA, ASSIGNOR TO SCOTT PAPER COMPANY, A CORPORATION OF PENNSYLVANIA.

CUT-OFF SAWING MACHINE.

Application filed October 6, 1924. Serial No. 741,813.

The object of my invention is broadly the provision of automatic means in association with a rotary saw for cutting long lengths of materials into short lengths, preferably of uniform size; and more specifically, the special object of the invention is an embodiment of my improvements in a sawing machine for severing cardboard tubes fed in a continuous manner from a tube making machine into short length tubes of uniform length but with capacity of adjustment to predetermine what the length of the severed tubes shall be.

My object is further, to utilize the moving tube from the tube making machine as the immediate power to move the saw in the direction of its axis of rotation, whereby the saw is caused to travel in exact accord. with the speed of travel of the tube and independent of the saw driving means, and positively returning the saw to its initial position after completing each severing operation. By providing means for securing this object, it is manifest that my improved cut-off saw is automatically operative with tube making machines, no matter what the speed of travel of the tube may be; and my invention would be equally operative if the speed of the tube or other article was made to vary for any reason.

With the above and other objects in view, the nature of which will be more fully understood from the description hereinafter, the invention consists in the novel construction of cut-off sawing machines, as hereinafter more fully described and defined in the claims.

Referring to the drawings: Fig. 1 is a side elevation of my improved cut-off sawing machine; Fig. 2 is an end view of same with the lower part of the stand broken away; Fig. 3 is a plan view of the target portion of the machine; Fig. 4 is a plan view and Fig. 5 a side elevation of a portion of the machine showing a somewhat different saw returning means than shown in Fig. 1; Fig. 6 is a side elevation showing a modified form of saw returning means embodying my invention; and Fig. 7 is a vertical section of the same on line 7—7; Fig. 8 is an elevation of a sawing means and target following the general features of Fig. 1, but showing modified electrical control; and Fig. 9 is a vertical section of the same taken on line 9—9.

With reference to the features of construction embodied in Figs. 1, 2 and 3, the sawing mechanism is supported upon a pedestal 2 secured to the floor or other foundation and the saw bed 3 is hinged to the top of the pedestal at 4 so that it may be oscillated by means of a movable core 6 of a solenoid 7, said core connected to an arm of the saw bed by a link 5. The saw bed 3 has secured to it at one end an electric motor 8, the shaft thereof having a tubular extension 11 provided with a longitudinal slot 15. This motor shaft is parallel with the axis of the hinge 4. The saw 9 is secured to the end of an arbor 10 which slides in the bore of the tubular extension 11 of the motor shaft and is caused to rotate with said motor shaft by a transverse pin 16 extending through the slot 15 and saw arbor, which, while causing the two parts to rotate in unison, permits the arbor to reciprocate longitudinally in the tubular extension. Sleeved on the tubular extension 11 is a collar 12 through which the pin 16 also extends, so that the collar and arbor move as a unit. Surrounding the collar hub and arranged between the annular flange thereof and a loose collar 13 at the forward end of the extension 11 is a coil spring 14 whose function is to automatically return the saw arbor and saw to its initial position when the saw is out of contact with the tube 17 to be severed (Figs. 1 and 2). It will be seen that the saw arbor 10 is parallel to the axis of the hinge 4 and also to the direction of travel of the cardboard tube 17, so that the saw 9 cuts the tube at right angles to its length. The tube 17, in the process of its manufacture is given a rotation as indicated by the arrow, so that when the saw bed 3 is oscillated and the saw 9 cuts into the side of the tube, it is only necessary that it shall penetrate deep enough to cut through the thickness of the tube wall since the rotation of the tube itself brings its entire perimeter into contact with the saw. If the article to be severed is solid, the same general operation would be required but the oscillation of the saw would have to cause it to cut at least to the center of the revolving article; so also, if the article did not revolve, then the extent of oscillation of the saw would be required to be sufficient to cause it to entirely sever the article. As the specific form of the article and its mode of manufacture is not a part of the present invention, I do not restrict myself to the extent of the oscillation of the saw, nor to the specific character of the article or work to be operated upon.

I will now describe the means for causing the solenoid 7 to be intermittently energized for moving the saw into and out of cutting position. At a distance from the saw is arranged a target 18 adapted to be operated by the end of the traveling tube or article 17, said target controlling an electric circuit in such manner that the solenoid is energized when the article 17 strikes the target and the saw continues to operate until the article is severed and the short length in contact with the target falls and releases the same, whereupon the electric circuit is opened and the solenoid put out of action. The saw base 3 then falls down by gravity and moves the saw 9 out of contact with the article 17 to be severed, as shown in Fig. 2. It is to be kept in mind that this severing action of the saw takes place rapidly and is completed in the period of time which would correspond to the advance movement of about two inches for the tube or article 17. During the remainder of the advance of the article 17 to meet the requirements to provide the length of it to be cut off, there is no movement given to the saw base by the solenoid, yet the saw is revolving all the time. However, as soon as the end of the article 17 reaches and operates upon the target to close the electric circuit the cutting action of the saw is instantly brought into play. As the advance of the article while being severed may be assumed as two inches and its total length twenty inches, it is manifest that an initial advance of eighteen inches was had before the saw came into cutting operation. This length, eighteen inches may be any length predetermined and for which the target 18 is properly positioned in respect to the saw.

Considering the specific features of the target shown, 27 is a pedestal extending upward from the floor and has, at its upper end, a vertical shaft 24 journaled in vertical bearings 26, the lower end thereof having a circuit closing contact 28 normally in open position by reason of the spring 28ª, but adapted to close the circuit between the contact terminals 29 and 30. This controls an electric circuit 38, the conductors of which may be grouped in a cable 31 leading up through the pedestal to the terminals 29 and 30 and including a snap switch 32 conveniently located on the pedestal 27, as shown. The vertical shaft 24 has a radial arm 23 adjustably bolted to it at 25, so as to be capable of adjustment both as to elevation and angularity. 20 is an angle bar having one leg adjustably clamped to the radial arm 23 at 22 and so as to be adjusted radially with respect to the shaft 24. The other leg of the angle bar 20 carries an adjustable target 19, the same being clamped at 21 in such manner as to be adjusted to or from the vertical shaft 24 and its arm 23, whereby the target may be positioned to require a greater or less movement in opening and closing the circuit contacts and also for accurately positioning the target in alinement with the end of the article 17. These various adjustments of the target relatively to the contact operating means enables the time of operation of the solenoid 7 to be very accurately determined so that the actual lengths of the article may be gaged to a small fraction of an inch.

The circuit 38, on one branch, has a connection with one of the terminals P of the outside supply circuit and also with one branch of the solenoid circuit 34. The other branch of the solenoid circuit 34 connects with the other terminal N of the outside supply circuit and including a normally open armature switch 35, the same being yieldingly held in open position by a spring 36. An electromagnet 37 having one terminal in closed circuit with the terminal N of the outside supply circuit and the other terminal electrically connected with the other branch of the circuit 38 (and hence controlled by the target 18) is adapted to operate the armature switch 35. These parts 35, 36 and 37 constitute a material part of a remote control system for timing the cutting action of the saw. This may be referred to as the remote control switch for the solenoid of the saw operating mechanism, and is itself controlled by the target and circuit controlling means thereof, aforesaid.

Briefly stated, the operation of the devices described is as follows: The target being set at the desired distance from the saw 9 and the latter being in rapid rotation, the rotating card board tube 17 is fed along a stationary guide rod 17ª toward the target 19. When it reaches the target it oscillates it to the dotted position, Fig. 3, and thereby closes the contacts 29 and 30 with the result of energizing the electromagnet 37 of the remote control switch 33. The armature switch 35 is attracted and closes the solenoid circuit 34 and thereby energizes the solenoid, causing it to oscillate the saw bed 3 and bring the rotating saw 9 into contact with the revolving tube 17. The saw cuts through the side of the tube and while severing the same is itself pulled along with the tube and causing a compression of the spring 14. With one revolution of the tube 17 the severance is completed and when the section thus severed falls from the target the circuit 38 is automatically opened, the remote control switch 35 released, circuit 34 opened and solenoid rendered inactive. The result of this is to permit the saw bed 3 to fall and throw back the saw 9 from contact with the tube. The tube continues to advance and when it again reaches the target the operations are repeated.

In the construction shown in Figs. 4 and 5, I have the same general arrangement of the saw operating means as in Fig. 1, but the device for returning the released saw to its initial position is different in minor particulars. Instead of the spring 14, I provide the collar 12 with a worm wheel 14ª loosely sleeved over the tubular extension 11 of the motor shaft. In addition to the worm, I provide a finger 14ᶜ fixed to the upper part of the pedestal so as to be stationary with respect to the oscillating saw bed 3. This device operates to return the saw in the following manner: When the saw is moved forward by the advancing tube 17 during the severing operation, the worm 14ª is lifted out of alinement with the finger 14ᶜ, but when the cutting is completed and the saw bed falls back, the worm 14ª is lowered into contact with the finger 14ᶜ and its positive rotation causes it and its saw to be positively fed back to the initial position (Fig. 4) where it is once more out of propelling contact with the finger.

In Figs 6 and 7, I have shown another modification of the means for returning the saw to its initial position. In this case, the saw arbor is provided with a transverse pin 16ª extending through the slot 15 of the motor shaft extension 11. A loose collar 12ª slides upon the extension and may be moved along it by the travel of the saw when severing the tube. A bell-crank lever 14ᵇ is pivoted to the top of the pedestal at 14ᵈ and has its lower leg 14ᵉ extended under the saw bed 3. When the bed 3 is raised, the bell-crank offers no obstruction to the free forward movement of the saw; but when severing operation is completed and the saw bed 3 falls back, its weight acting on the leg 14ᵉ of the bell-crank lever 14ᵇ positively oscillates it to force back the collar 12ª, arbor 10 and saw 9 to the initial positions.

Referring now to Figs. 8 and 9, I have here illustrated the general equipment of Figs. 1, 2 and 3, with a modified form of the electric control. The special features of difference over what is shown in Fig. 1, resides in the employment of electric switch and circuit controls operated by the movements of the advance and return mechanism for the saw, whereby the advance travel and return of the saw is not alone dependent on the operation of the target controlled switch (said switch operating only for throwing the saw into cutting action with respect to the tube), but is also dependent for the maintaining of the saw in cutting operation and final return to initial position upon commutator means controlled independent of the target and the tube. Referring to these means, 39 is the sliding commutator movable upon a guide 40 on the saw bed 3 and provided with a short contact strip 43 and a long contact strip 44. Movement is imparted to the sliding commutator 39 by the sliding collar 12ª, in an annular groove of which a projection from the commutator extends. A spring contact 41 coacts with either of the contact strips 43 or 44 at all times. A second spring contact 42, supported from the top of the pedestal, coacts alone with the long strip 44 of the commutator and then only when the saw bed 3 is oscillated to bring the saw into cutting relation with the tube to be severed. The short contact strip 43 is connected by a circuit 38ª with the target contact 30, the spring contact 42 is connected by a circuit 38ᵇ with the circuit 38ª, and spring contact 41 is connected by circuit 38ᶜ with the line terminal P. Otherwise, the circuit connections between the line terminals, the solenoid 7, the remote control switch 33 and the target control switch 18, are the same as previously described in respect to Fig. 1.

The operation of the construction in Fig. 8 is as follows: Assuming that the tube 17 to be severed is advanced until it operates the target 19, this will close the contacts 29 and 30 and permit current to flow from line terminal P through circuit 38ᶜ to spring contact 41, thence by commutator strip 43 and circuit 38ª (including target contacts 29 and 30) to snap switch 32, thence to circuit 38 (including electromagnet 37) to line terminal N. This causes the electromagnet 37 to be energized to move armature switch 35 and close solenoid circuit 34, the same receiving current from the line terminals P and N. The solenoid is then energized and oscillates the saw bed 3, bringing the saw into cutting operation on the tube 17 (not shown). The saw is moved by and with the advancing tube and this moves the commutator 39 along its guide 40 and compresses the spring 14. As the commutator moves to the right, the short contact segment 43 is shifted out of contact with spring contact 41 and thereby opening the circuit 38ª, but at the same time the long segment 44 of the commutator is moved into contact with the said spring contact 41. Furthermore, when the saw bed was oscillated the long strip 44 of the commutator was brought into operative contact with the spring contact 42, and consequently when the circuit 38ª was opened a branch circuit 38ᵇ was closed through contacts 42, 44 and 41 and thereby the electromagnet 37 and solenoid 7 continued to be energized. The saw continues to advance with the tube and when the long contact strip 44 travels beyond the spring contact 42 the circuit 38ᵇ is opened, with the result of demagnetizing the electromagnet 37. The circuit 34 is thereby opened and the power of the solenoid having been eliminated the saw bed falls and removes the saw from contact with the tube. The spring 14, thereupon, comes into play and moves the saw back to its initial position as shown. This insures a positive distance of travel of the saw before being thrown out of cutting relation with the tube and permits the severing operation to be definitely concluded without dependence on the target equipment beyond the starting of the sequence of operations. It will be understood that the mechanical means for returning the saw may be substituted by the worm or bell-crank features of Figs. 4 and 6, if so desired, as I do not restrict myself in this respect.

From the foregoing explanations it will be seen that the speed of travel of the saw in cutting is dependent on the speed of the tube or other article to be severed, the return of the saw is positively accomplished by means operating independently of the means for feeding the tube or article; and in the preferred remote control means the extent of the longitudinal reciprocations of the saw is predetermined and governed by the travel of the saw and its arbor. Furthermore, the operations of the saw in repeating the severing acts are dependent wholly upon the speed of travel of the tube or article to be severed and the lengths given to the severed parts thereof and wholly independent of the mechanism for making the tube or article.

The connection between the target and sawing mechanism being only the flexible electric conductors forming the circuits, the position of the target may readily be adjusted to or from the saw to determine the length to be given to the subdivisions of the tube or article.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having thus described my invention, what I claim as new and desire to secure by Letters Patent is:

1. In a machine of the character stated the combination of a saw, operating means therefor, means for moving the saw toward and from the article to be severed in a plane coincident with the cutting plane of the saw, means for permitting the saw to travel freely along with the article by its severing contact therewith, a target at a distance from the saw and arranged to be operated when reached by the article, means controlled by the target for controlling the operation of the means for moving the saw toward the article to be severed, and additional positively operating means independent of the target for automatically returning the saw to its initial position when moved out of contact with the article being severed.

2. The invention according to claim 1, wherein further, the means for moving the saw toward and from the article to be severed are directly electrically operated, and the means controlled by the target are electric circuit controlling devices for controlling the operation of the electrically operated means.

3. The invention according to claim 1, wherein further, the means for moving the saw toward and from the article to be severed is a hinged saw bed, the saw is a rotary circular saw driven by a rotating shaft on the bed and whose axis is at a distance from and parallel to the axis of the hinge, and the means for permitting the saw to travel freely along with the article consists of an arbor freely slidable longitudinally upon the rotating shaft but at all times in rotatable connection with it.

4. In a machine of the character stated, the combination of a saw, operating means therefor, means for moving the saw toward and from the article to be severed in a plane coincident with the cutting plane of the saw, means for permitting the saw to travel freely along with the article by its severing contact therewith, a target at a distance from the saw and arranged to be operated when reached by the article and comprising a rock shaft having thereon a plate against which the article to be severed presses and in which said plate is secured to the rock shaft so as to be adjustable toward and from the saw while maintaining the same angularity to the axis of the advancing article, means controlled by the target for controlling the operation of the means for moving the saw toward the article to be severed, and positively operating means for returning the saw to its initial position when moved out of contact with the article being severed.

5. The invention according to claim 4, wherein further, the target plate and its adjustable means are also adjustable longitudinally of the rock shaft.

6. The invention according to claim 4, wherein further, the adjustable plate is also adjustable radially toward or from the rock shaft.

7. The invention according to claim 1, wherein further, the means for moving the saw toward and from the article to be severed are directly electrically operated, and the means controlled by the target are electric circuit controlling devices for controlling the operation of the electrically operated means, and wherein means are also provided for automatically opening the circuit controlling the electrically operable means after the saw has moved a definite distance along with the article being severed, whereby the ending of the sawing operation on the article is governed independently of the action of the target, and the automatic means for returning the saw to its initial position is put into action.

8. The invention according to claim 1, wherein further, the means for moving the saw toward and from the article to be severed are electrically operated, and the means controlled by the target are electric circuit controlling devices for controlling the operation of the electrically operated means for moving the saw into sawing position, and wherein means are also provided for automatically opening the circuit controlling the electrically operable means after the saw has moved a definite distance along with the article being severed, said means independent of the target controlled means and comprising a movable electric switch device having a contact part movable with the saw and other contact part in relatively fixed position thereto and whereby the switch device is automatically closed when the saw is returned to its initial position.

9. The invention according to claim 1, wherein further, the means for moving the saw toward and from the article to be severed are electrically operated, and the means controlled by the target are electric circuit controlling devices for controlling the operation of the electrically operated means, and wherein the electric controlling means comprises a circuit closing switch controlled by the target, a circuit opening switch controlled by the saw when moved along with the article to be severed, and a circuit closing switch in addition to the target switch operable when the saw is moved toward the article to be severed, all of said switches to maintain the electrically operable means energized to continue the operation of the saw upon the article and the latter of said switches to automatically open when the saw has been moved with the article to the desired extreme distance for the purpose of putting the electro operable means out of circuit and permitting the saw to move away from the article prior to returning to its initial position.

10. The invention according to claim 1, wherein further, the saw and saw operating means are supported upon one pedestal and the target supported upon a separate pedestal so that the target is adjustable as to distance from the saw operating means, and wherein further, the means controlled by the target includes flexible connections to the working parts of both pedestals.

In testimony of which invention, I hereunto set my hand.

PHILIP D. PARSONS.